United States Patent [19]

Winther

[11] 3,717,845
[45] Feb. 20, 1973

[54] VEHICLE TIRE DEFLATION SIGNALLING SYSTEM

[75] Inventor: Harry C. Winther, Glen Mills, Pa.

[73] Assignees: Harry C. Winther; Walter J. Winther; Charles R. Winther; William J. Winther; Shirley N. Winther, ; part interest to each

[22] Filed: Feb. 8, 1971

[21] Appl. No.: 113,566

[52] U.S. Cl..................................340/58, 200/61.25
[51] Int. Cl..............................................B60c 23/02
[58] Field of Search...........340/58; 200/61.22, 61.25

[56] References Cited

UNITED STATES PATENTS 2,958,746  11/1960  Hawkins..........................200/61.25
2,309,025  1/1943   Thorson............................340/58 X
2,846,664  8/1958   Amundsen, Jr. et al................340/58

Primary Examiner—Alvin H. Waring
Attorney—Wycliff Walton

[57] ABSTRACT

A mechanism for actuating signalling means primarily at the operator's station of an automotive vehicle to indicate deflation or under inflation of a pneumatic tire on any of the load-carrying wheels of the vehicle, mechanical means carried by the wheels being provided for actuating an electrical switch positioned on a relatively fixed portion of the vehicle to activate the signalling means upon the pressure in the adjacent tire falling below a predetermined value.

6 Claims, 4 Drawing Figures

PATENTED FEB 20 1973 3,717,845
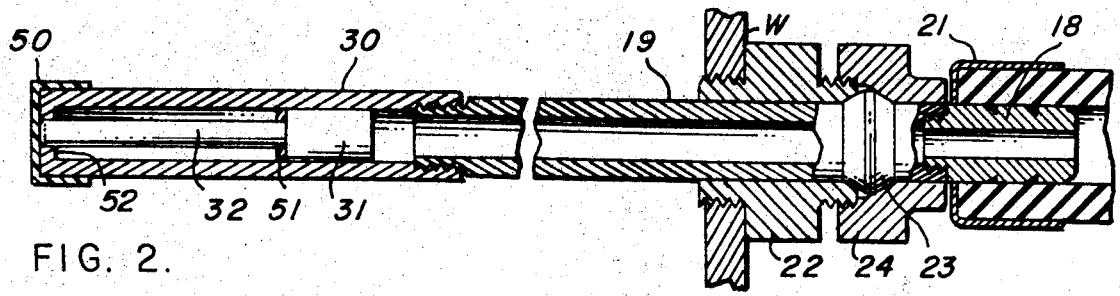
FIG. 2.
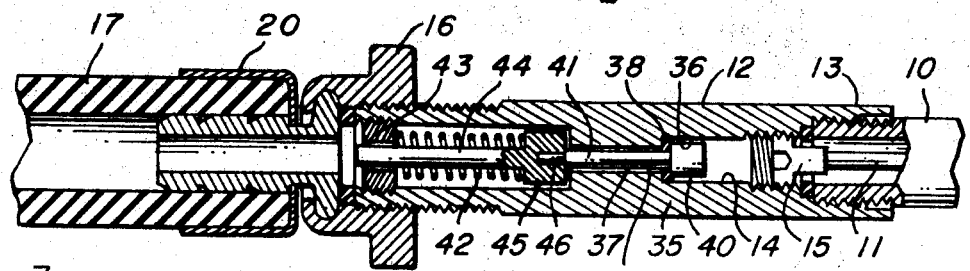
FIG. 3.
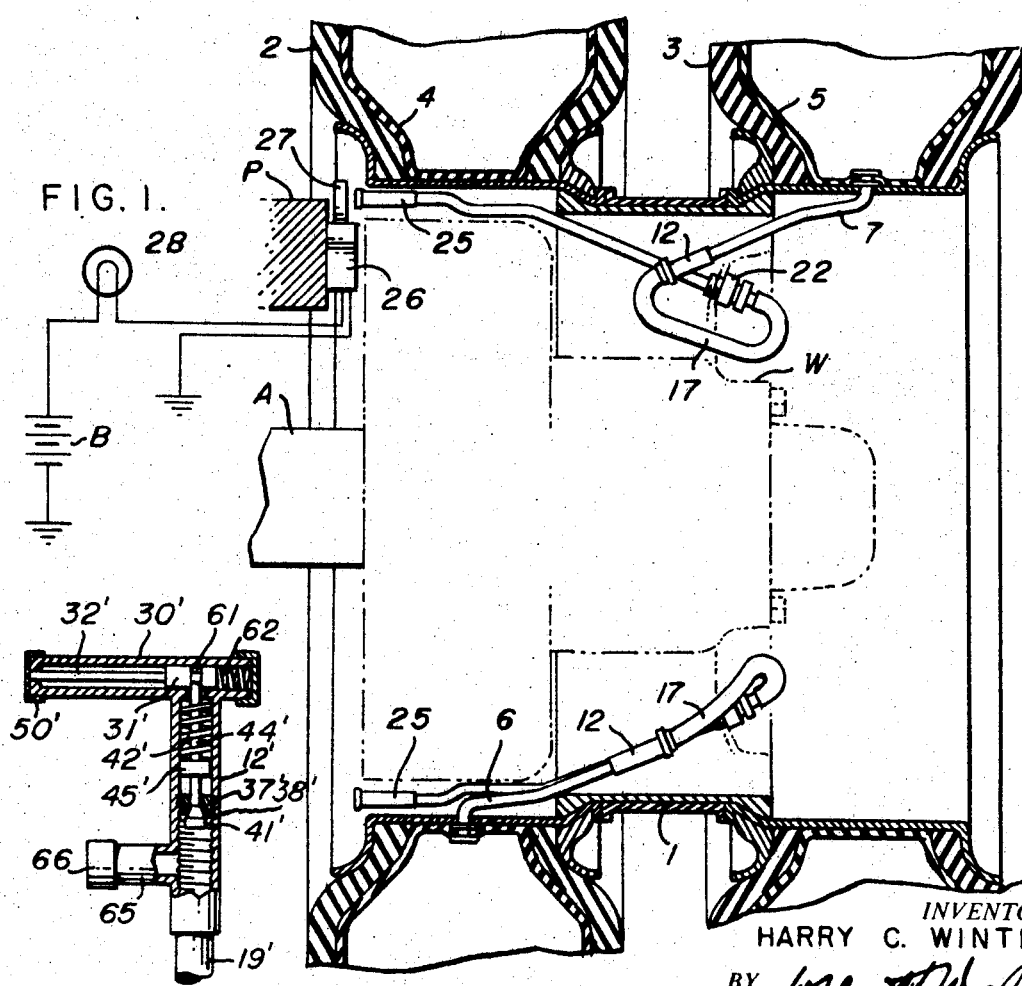
FIG. 1.
FIG. 4.
INVENTOR.
HARRY C. WINTHER
BY *Wyatt Walton*
ATTORNEY.

VEHICLE TIRE DEFLATION SIGNALLING SYSTEM

BACKGROUND OF THE INVENTION

Modern automotive vehicles, especially trucks and buses of considerable weight and load carrying capacity are usually equipped with pneumatice road engaging tires which are very expensive and readily damaged if forced to support a normal load in deflated or under-inflated condition. The possible causes of deflation and under-inflation are many and it is important not only for the protection of the tires but also for the safety of the vehicle that knowledge of deflation and under-inflation be conveyed to the operator as promptly as possible after its occurence.

There have heretofore been suggested many devices for signalling to the operator upon failure of any of the tires of automotive vehicles to maintain proper pressure, usually involving the establishment of an electrical alarm circuit utilizing the wheel bearings as conductors in the circuit, which is undesirable.

FIELD OF THE INVENTION

In accordance with the present invention there is no utilization of the wheel bearings of a vehicle as conductors of an alarm circuit, the electrical components of my apparatus being carried entirely on the vehicle frame and body, and thus maintained stationary with respect to the latter and independent of the rotating wheels on which the vehicle is supported, a mechanical element carried by each wheel being provided for actuating an electrical switching element when a condition of under-inflation occurs, but otherwise remaining inactive and at rest with respect to the wheel during normal operations.

More specifically, the apparatus includes a piston actuated trigger or tripping means projectible into a path intersected by a switch actuating lever controlling the electrical alarm circuit when the pneumatic pressure in the tire on an associated wheel falls below a predetermined value, air under such reduced pressure then passing to a cylinder containing a piston which when actuated causes the trigger to be projected into said path.

DESCRIPTION OF THE PRIOR ART

As has been intimated alarm systems with which I am familiar designed for the same general purposes and disclosed in the prior art usually depend for their operation upon transmission through the wheel bearings of an electrical alarm circuit, and thus embody contact making means carried by the wheel and rotatable with it and a brush or other element on the frame part which said contact means slide as the wheel rotates. While these mechanisms may be positioned within the wheel brake drum or in some other relatively protected location it is difficult to insure their constant readiness to operate promptly on occurrence of a change in the pressure in the associated tire.

SUMMARY OF THE INVENTION

In the present apparatus mechanical elements only are carried by the wheel and no transmission of electrical or inductive energy from the relatively moving parts of a wheel to the vehicle frame is contemplated. Moreover, the wheel-borne elements of the apparatus are positioned and designed to minimize interference with normal servicing of the vehicle tires and to require themselves only minimum attention, while those carried by the vehicle frame and body comprise principally relatively simple electrical elements adapted to be connected with the main electrical system of the vehicle and normally need no servicing other then resetting after an alarm has been given. The mechanically operated switch in the electrical alarm circuit may, however, be an automatically resetting one in which case no servicing whatever of the electrical element of the apparatus will normally be required.

BRIEF DESCRIPTION OF THE DRAWING

In the accompanying drawing a preferred embodiment of the invention is illustrated, in FIG. 1 by a partially diagrammatic fragmentary section of a typical dual tire automotive vehicle wheel showing the wheel-borne elements of my apparatus associated therewith and by line diagram an electrical circuit which may be employed therewith, FIGS. 2 & 3 constitute composite enlarged fragmentary section of the said elements in their normal relation to each other but removed from the wheel and FIG. 4 is a fragmentary section on a reduced scale of a modified embodiment of the invention in which spring-loaded switch-actuating piston is held retracted by a detent responsive to loss of pressure in the tire with which it is associated.

DESCRIPTION OF THE PREFERRED EMBODIMENT

Referring now more particularly to the drawing, there is illustrated in FIG. 1 a typical dual truck wheel 1 on which are mounted in conventional manner pneumatic tires 2,3, in this instance confining inner tubes 4,5, with which are connected, respectively, air injection tubes 6,7, all these components being conventional and susceptible of modification, the use of tubeless tires in association with the apparatus of my invention being expressly within the contemplation of the latter. In any event, the air injection tube 10 (FIG. 3) may be deemed exemplary of any usual tubular member through which a tire or the like may be inflated, containing a valve (not shown) having a depressible stem 11 whereby the valve may be opened.

In accordance with the invention there is associated with each tire a tubular control valve 12, having an internally threaded end zone 13 complementing the threaded air injection tube 10 and carrying in its bore 14 a detent 15 whereby when the fitting 13 is screwed on tube 10 valve stem 11 is depressed to allow the pressures in the tire and in the adjacent portion of pressure differential means 12 to attain equilibrium. The opposite end of valve means 12 is releasably connected through an internally threaded fitting 16, with a flexible hose 17 the opposite end of which is connected by a fitting 18 with a metal tube 19, the fittings 16 & 18 being secured to the hose 17 by clamps 20,21, respectively. The metal tube 19 projects through an appropriate hole in a suitable part of the wheel and is secured to a bushing 22 threaded in to the wheel body W by a compression collar 23 and gland nut 24 threaded on the other end of bushing 22. The tube 19 projects inwardly toward the vehicle body and carries at its inner end a mechanical component 25, hereinafter more fully described, positioned to follow with the wheel a path adjacent a relatively fixed part P of the vehicle. There is mounted on part P a switch 26 actuated by an arm 27 and controlling the circuit of signal lamp 28 or other alarm device in series with a battery B, which may be the main ignition battery of the vehicle, or any other energy source suitable for the purpose.

The components thus far specifically described may be considered exemplary only and subject to wide modification to suit particular conditions and they may therefore partake of any appropriate form, each specifically and individually being found in other associations and forms in apparatus disclosed in the prior art.

In accordance with the invention, however, the component 25 is connected at the free end of metal tube 19 for rotation with wheel W in a path adjacent arm 27 of switch 26 and comprises a cylinder 30 containing a piston 31 which carries an elongated piston rod 32 projectible into the plane of a path including the switch 26 for actuating the latter when the occasion arises.

Air under pressure has access to the cylinder 30 for actuating piston 31 from valve stem 10 and with reference to the flow of air from the latter to the former there is interposed in the connecting conduit provided principally by hose 17 and tube 19 pressure-differential valve means 12 comprising a cylindrical valve housing 35 at one end threaded onto valve stem 10 and at the other end threaded into fitting 16 carried by hose 17. Approximately midway longitudinally bore 36 in housing 35 is constricted at 37 to form a waist providing at its end nearer tube 10 an annular valve seat receiving a gasket 38 normally engaged by the head 40 of a valve poppet 41, spring 42 tends to oppose the tendency of the valve poppet head to bear in fluid tight relation against gasket 38 under the influence of the air pressure being retained thereby in tube 10 and the associated tire. This spring 42 is confined in the opposite end of the bore of valve housing 35 by a threaded bushing 43 receiving the projecting stem 44 of a control plunger 45 having a bore into which the reduced end 46 of the valve poppet stem 47 projects.

It will be apparent the bushing 43 may be adjusted in the threaded bore of housing 35 so as just to overcome the air pressure in tube 10 when such pressure is unable to maintain valve poppet 41 seated in sealing relation against valve seat gasket 38 or, if preferred, a spring of appropriate bias may be selected so the bushing can be fully seated in the bore.

Obviously when unseating of the valve poppet in this manner occurs due to decline of air pressure in the associated tire, the air released from the latter passes from tube 10 through hose 17 and tube 19 to cylinder 30, where it impels piston 31 to project the piston rod 32 axially outwardly with respect to cylinder 30 and thus into an abnormal path intersected by arm 27 on switch 26. Usually during this operation disposable dust cap 50 of plastic or other appropriate material, normally protecting cylinder 30 against intrusion of foreign materials into its interior, is discharged from the end of the cylinder, to be replaced, or a like cap substituted for it, after the tire has been serviced to remedy the lost pressure and the signal apparatus reset.

Outward projection of the piston 31 in the manner just described causes the piston rod 32, travelling in said abnormal path, to actuate arm 27 on engaging it during rotation of the wheel and immediately convey to the vehicle operator that a tire is deflated or at least under-inflated, while a gasket 51 on the piston rod 32 adjacent the piston head 31 seats against the outer head 52 of cylinder 30 to seal the latter and thus prevent further loss of pressure from the associated tire.

In a modified embodiment of the invention fragmentarily illustrated in FIG. 4 there is utilized instead of the cylinder 30 and air activated piston 31 for projecting piston rod 32 into the path intersected by the trigger of switch 26 a somewhat different mechanical arrangement of components, designed to attain comparable results. Thus at the end of tube 19', corresponding to tube 19, there is disposed a spring pressed valve poppet 41', seating on an annular seat 38' in a bushing 37' threaded into tubular element 12' which is in turn secured to tube 19' by a threaded connection.

The valve poppet 41' is biased by a spring 42' bearing against a collar 45' on the valve stem 44' to oppose the seating of the valve by the pressure of air on the poppet head, the stem projecting into a transversely disposed cylinder 30' where it engages in a groove 61 in spring biased piston 31' carrying piston rod 32'.

The engagement of the stem of valve poppet 41' in groove 61 of piston 31' restrains spring 62 biasing the piston from projecting the latter outwardly for driving the piston rod 32' into position for engaging the trigger of the alarm switch (not shown) corresponding to switch 26, plastic cap 50' being discharged and discarded as the piston rod ejects it from the end of cylinder 30'.

A lateral fitting 65 containing a standard tire valve, (not shown) and removable cap 66 communicates with the interior of tubular element 12' and permits the associated tire to be serviced without disconnecting the warning apparatus and its employment may sometimes be more convenient than unscrewing the flexible tube connector 16 from pressure differential valve means 12.

It will be evident from what has been said that when a tire with which the apparatus of my invention, of whatever specific form, may be associated is subjected to a loss of pneumatic pressure sufficient to enable the pressure-differential responsive control mechanism to become activated the alarm system is energized to advise the operator of the condition of the corresponding tire. Hence, if desired an independent alarm system for each wheel may be provided, informing the operator specifically as to the location of the wheel on which inflation has been lost, or the switches 26 corresponding to the several respective wheels may be connected in a single circuit, in which case the operator is advised by the signal only that at least one tire requires attention, leaving it to him to determine on inspection which individual tire has become so under-inflated as to activate the alarm.

This inspection is of course an easy one to make since the projection of a piston rod 32 or 32' from the cylinder containing it may readily be observed and the appearance of a projected one is adequate evidence of the associated tire requiring reinflation as the minimum servicing essential to resumption of normal operation.

It is of course immaterial whether the alarm circuit, including the switch 26, be of such nature as to be a normally energized one and the switch one having normally closed contacts, which upon being activated give alarm through interruption of a signal as by extinguishment of a normally energized bulb 28, or the switch have normally open contacts so as to energize the circuit and hence light bulb 28 to indicate an abnormal low pressure condition of a tire.

While some emphasis has herein been laid upon utilization of the apparatus of my invention on relatively heavily burdened vehicles such as trucks and buses it will be evident it may be employed as well on passenger automobiles and any other vehicles having pneumatic tires or in fact in any situation in which it is desireable to provide information as to the inflation of a moving object containing a gas under pressure and adhering to a uniform path or rotation, reciprocation or otherwise.

I claim

1. Apparatus of the character described comprising a pressure-differential-responsive valve, a mechanical element carried by a moving structure movable relatively to said structure into a path abnormal with respect to said structure, a relatively stationary signal-activating element interposed in said path for actuation by said element when in said abnormal path, means defining a fluid conduit carried by said structure and pressure responsive means for projecting said mechanical element into said abnormal path in response to pressure-differential actuation of said valve and introduction thereby of fluid pressure into said conduit from said valve.

2. Apparatus as defined in claim 1 in which the moving structure is rotatable and the relatively stationary signal activating element comprises a lever engageable by said mechanical element during its rotation.

3. Apparatus as defined in claim 1 in which the moving structure is a vehicle wheel, the relatively stationary signal activating element is carried by the vehicle body and said mechanical element is actuated by air-pressure derived from the wheel tire when air under pressure is released from the tire by the pressure-differential-responsive valve.

4. Apparatus of the character described comprising a pressure-differential-responsive valve, a mechanical element carried by a moving structure movable into a path abnormal with respect to said structure, a relatively stationary signal-activating element interposed in said path for actuation by said element when in said abnormal path and means carried by said structure for projecting said mechanical element into said abnormal path in response to pressure-differential actuation of said valve, said pressure-differential-responsive valve comprising a spring biased valve poppet, a substantially cylindrical housing for the poppet providing a valve seat for the poppet, the spring biasing the poppet away from said seat, and said movable mechanical element being adapted to be actuated by fluid under pressure after the spring has separated the poppet from its seat.

5. Apparatus as defined in claim 4 in which the poppet is normally held in sealing engagement with its seat against the spring bias by fluid pressure in said housing.

6. Apparatus as defined in claim 1 in which said signal activating element comprises a housing, a complementary plunger slidable therein and a rod carried by the plunger constituting the movable mechanical element and being engageable with said signal activating element.

* * * * *